April 30, 1957 J. R. GOMERSALL 2,790,885
ELECTRIC TOASTER

Filed Aug. 9, 1952 3 Sheets-Sheet 1

INVENTOR.
JOHN R. GOMERSALL

BY
Karl W. Sommermeyer
Atty

April 30, 1957 J. R. GOMERSALL 2,790,885
ELECTRIC TOASTER
Filed Aug. 9, 1952 3 Sheets-Sheet 2

INVENTOR.
JOHN R. GOMERSALL
BY
Karl W. Sommermeyer
atty

April 30, 1957    J. R. GOMERSALL    2,790,885
ELECTRIC TOASTER
Filed Aug. 9, 1952    3 Sheets-Sheet 3
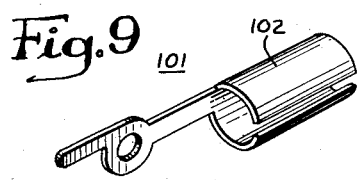
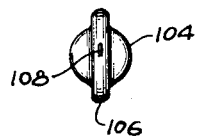  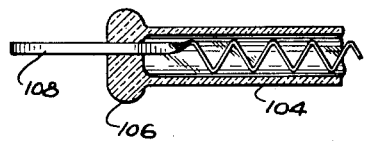
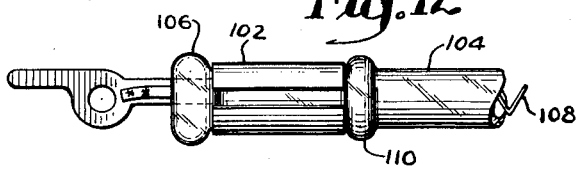
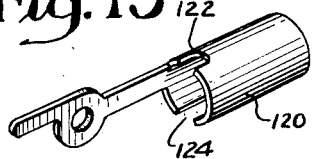
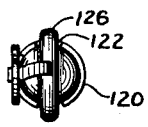  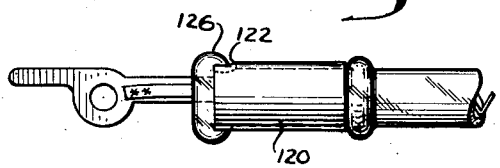
INVENTOR.
John R. Gomersall
BY
Karl H. Sommermeyer
Atty.

United States Patent Office 2,790,885
Patented Apr. 30, 1957

2,790,885

ELECTRIC TOASTER

John R. Gomersall, Elgin, Ill., assignor to McGraw-Edison Company, a corporation of Delaware Application August 9, 1952, Serial No. 303,525

7 Claims. (Cl. 219—19)

The present invention relates to constructions for electric terminals, supporting connectors, and the like, fitted to glass tubes.

This application is a continuation in part of my copending application Ser. No. 145,753, filed February 23, 1950, now Patent 2,606,989, issued August 12, 1952.

For use in toasters and the like, glass-enclosed heaters have certain advantages, such as the protection of the resistance conductor against oxidation and mechanical injury, and the provision of good support for the conductor while permitting free radiation of heat therefrom. Because glass is brittle, it is important that the tube be so supported, and that terminal connections be so made, as not to subject the glass to severe strains or shocks.

Objects of the invention include the provision of an improved electric terminal and mounting for glass-tube devices, the provision of an improved mounting for fragile structures, and the provision of an improved electric heating element. To this end I provide a metal connector that serves as a combined electric terminal and mounting piece. In one form it is constructed of light sheet metal and includes a cylindrical part that loosely embraces the end of the glass tube. In another form a cylindrical part fits within the tube end which may be enlarged at that point for extra strength.

These and other objects and advantages will be apparent from the following description of certain specific embodiments which illustrate the manner in which the invention may be carried out. In the drawings:

Fig. 9 is a pictorial view of a connector for a modified terminal construction;

Figs. 10 and 11 are an end elevation and a partial section of a glass tube and resistor formed for the connector of Fig. 9;

Fig. 12 is a partial elevation of a complete terminal construction formed of the pieces shown in Figs. 9, 10 and 11;

Fig. 13 is a pictorial view of another modified metal connector; and

Figs. 14 and 15 are elevations of a complete terminal construction including the connector of Fig. 13.

Figure 1:
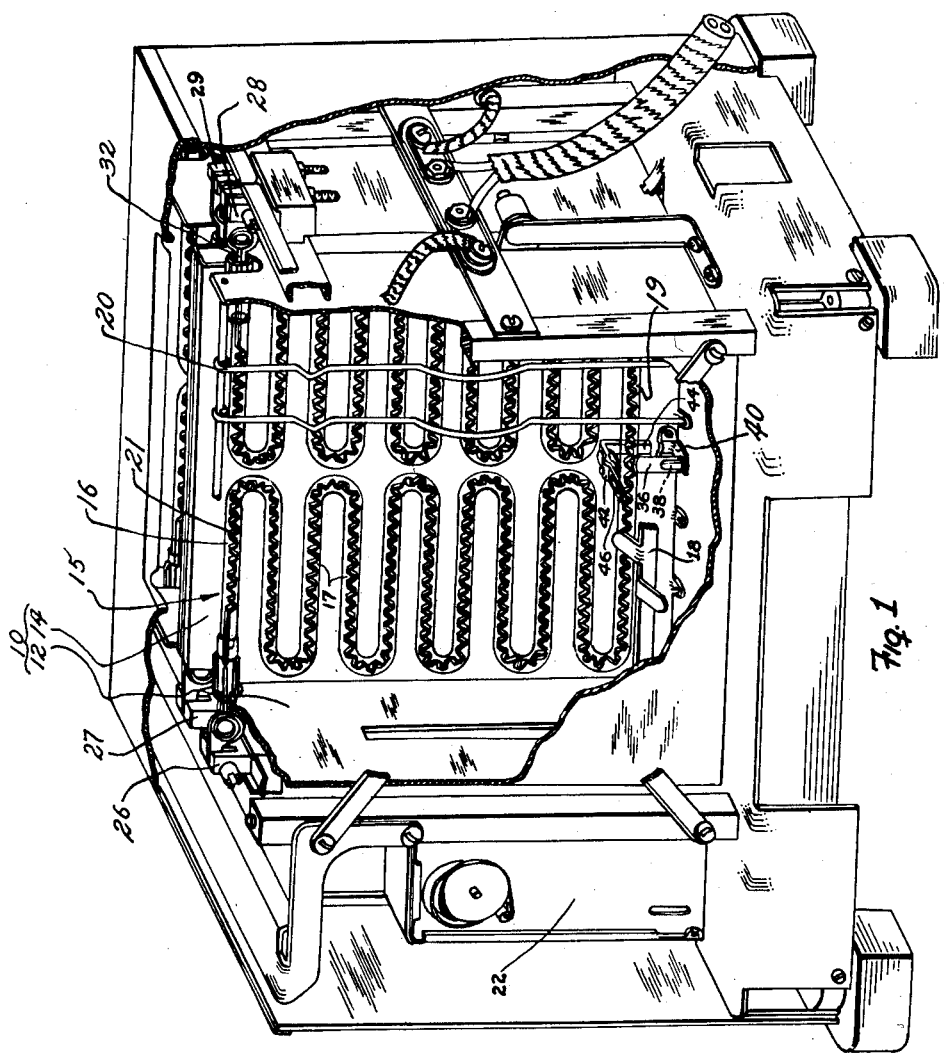
Figure 1 is a pictorial view of a toaster, partly broken away to show a heating element embodying the present invention.

Except for the heating elements, the toaster shown in Fig. 1 is substantially like that shown in U. S. Patent 2,012,788. It includes a plurality of individual oven chambers 10, each enclosed by a metal box having end walls 12 and side walls 14. The two heating elements 15, of which only one is shown, are disposed on opposite sides of this well-like oven space for toasting the two sides of a single piece of bread which may be supported on a carrier 18 and held away from contact with the heating elements by vertical guard wires 20. The bread-supporting rack 18 is moved up and down by mechanism not shown. It is moved down manually and it pops up under control of a suitable timer here shown as a clock 22, in a manner now well known. The toaster includes electric terminals 26, 27, 28 and 29, and also others (not shown) to which the heating elements may be connected.

The heating element 15 includes a glass tube 16 convoluted to substantially fill a square plane and to have ends extending from the two upper corners. A convolute electric conductor 21 extends through this tube 16 and has metal terminal members 32 sealed in the ends of the tube for attachment to the terminals 26 and 28 carried by the toaster frame.

The convolute conductor 21 is in the form of a crimped ribbon, and the glass tube 16 is round so that the ribbon touches the tube only in a few spots. Preferably the element 15 is constructed as follows: A length of crimped ribbon is cut to the required value of electric resistance, then stretched out to the required length, provided with a seal-in lead (to be described presently), and inserted in a straight glass tube of the required length. The glass tube is then bent to the required form and the terminals 32 are added.

A third support for the heating element includes a glass stub 36 that is fused to the bottom horizontal run 19 of the tube 16 and extends down therefrom. In the specific form here shown this stub consists of a piece of glass tube that sets over a pin 38 on a bracket 40 which is fastened to the wall 14 of the oven structure.

Figure 2:
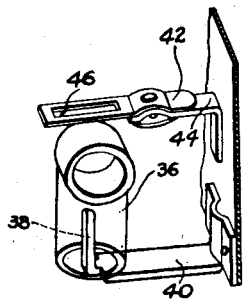
Figs. 2, 3 and 4 are views of the lower mounting of the heating element shown in Fig. 1.
Figure 3:
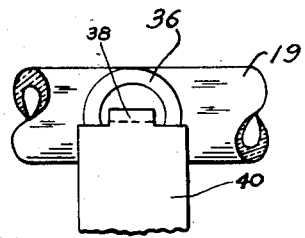
Figure 4:
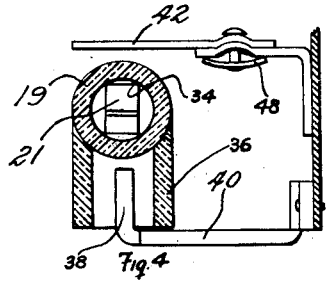
Figure 5:
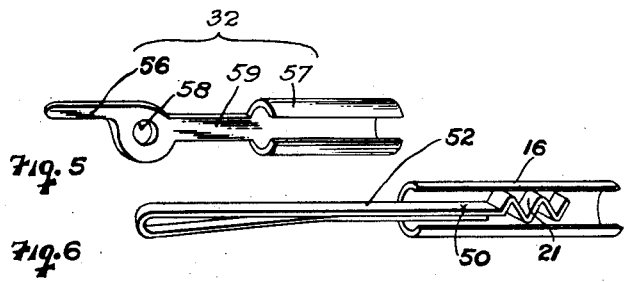
Fig. 5 is a pictorial view of the metal connector forming a part of the terminal construction in Fig. 1.
Figure 6:
Figs. 6 and 7 are pictorial views partly in section showing steps in the making of the terminal.

Just above the bottom horizontal run 19 of the tube 16 is a bumper spring 42. As is shown best in Fig. 4, this spring is spaced slightly above the glass tube so that during the normal operation of the toaster it will not touch the glass. However, should the stub 36 be raised from its seat on bracket 40, as when the toaster is jolted or dropped, the tube stops against the bumper 42. The resilience of the glass tube 16 permits such movement of the bottom portion, and the bumper, by absorbing the shock, reduces the strain on other portions of the tube, particularly on the portions near the terminals 32. The bumper 42 is pivoted on a bracket 44 and has a slot 46 that may be engaged by a screw driver or the like for turning it into and out of the tube-retaining position in which it is shown in Figs. 1, 2 and 4. It is yieldingly held in that position by a spring washer 48 cooperating with the cam surfaces 50 formed in the bumper 42 and bracket 44.

Figure 7:
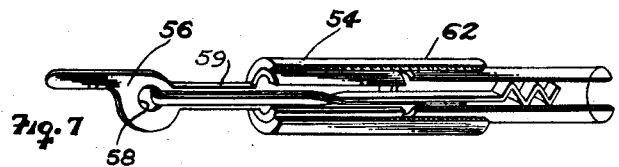
Figure 8:
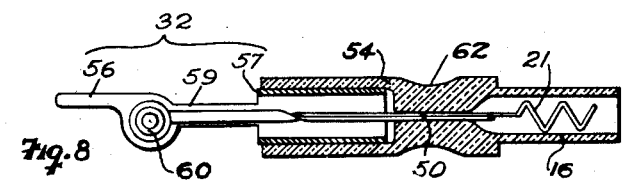
Fig. 8 is a sectional elevation of the finished terminal construction.

Figs. 5–8 show the construction of the terminals 32. The end of the heating-conductor ribbon 21 is doubled back on itself and spot-welded as at 50 in Fig. 6 to form a portion of double thickness as at 52 which will constitute a seal-in lead. This lead may be conveniently formed before the ribbon is inserted in the glass tube 16. Then, the tube 16 having been formed, a short glass bushing 54 is slipped onto its end as shown in Fig. 7. The metal terminal member or connector 32 is slipped into the other end of the bushing 54 and the end of the doubled lead 52 is threaded through the hole 58 in the connector and folded back. The terminal is completed by riveting a grommet 60 into hole 58 to clamp the lead 52, and by heating and pressing the two pieces of glass at 62 to fuse the bushing 54 and tube 16 together and to seal in the lead 52.

Care is taken not to press the glass tight against the cylindrical part 57 of connector 32 so as to leave it free to turn in the tubular end of glass bushing 54 which has now become an integral part of tube 16. The lead 52 is flexible and so permits this rotation but prevents withdrawal of the terminal. The neck part 59 of connector 32 bends more easily than the more rigid, cylindrical part 57 so as to accommodate misalignment without bending the part that is in contact with the glass tube. Tab 56 is adapted to be clamped in a terminal as shown in Fig. 1. When the heating element is mounted in the toaster, a misalignment of a terminal post, such as 27, tends to impose a strain on the heating element. The present construction insures that in such a case no great strain will be imposed on the glass. Thus the rotation of the terminal 32 accommodates misalignment about the longitudinal axis, the bending of neck 59 accommodates misalignment about the vertical axis as seen in Fig. 1, and the flat clamping faces of tab 56 permit rotation about the transverse horizontal axis for accommodating misalignment in that direction.

In the terminal construction of Figs. 9 to 12, a metal connector 101 has a cylindrical sleeve portion 102 that will slip over the glass tube 104 (similar to glass tube 16) of the heating element. To assemble the terminal, the sleeve 102 is slid onto the end of the glass tube 104 and end of the tube is heated and pressed at its end 106 to seal the tube and anchor the conductor 108 as shown in Figs. 10 and 11. The sleeve then is moved outward so that it abuts the expanded part of the press 106, and a bulge 110 is formed inward of it by heating the glass and pushing the glass the tube together axially. The end of the wire 108 may be anchored to the metal connector 102 by welding it to the neck 112 as shown in Fig. 12. Sufficient length of the conductor 108 is left between the press 106 and the welds to leave it flexible for accommodating rotation of the connector on the glass tube.

Figs. 13 to 15 show a construction similar to that of Figs. 9 to 12, in which rotation of the connector around the glass tube is limited. There the sleeve 120 of the connector includes notches 122 and 124 for engaging the expanded part 126 of the press of the glass tube.

Terminals for glass-tube heating elements and terminals made according to the present invention are simple, cheap, durable and effective. For example, I have found them sufficiently resistant to mechanical shocks that they survive accidents that are likely to damage the case or other parts of the toaster.

It will be apparent to those skilled in the art that the invention is capable of numerous modifications and variations within the scope of the appended claims.

I claim:

1. The combination with an elongated, glass tube, a wire-like, flexible electric conductor extending therethrough, said tube having a constriction near, but spaced from, one end for sealing and anchoring said conductor, a metal terminal member projecting into the end of said tube and rotatable therein, its inward motion being limited by said constriction, said conductor including a flexible portion extending outwardly from said constriction and fastened to said terminal member at a point spaced from the anchoring of the conductor at the constriction for making electric connection therewith and holding it in the tube, the flexibility of said conductor permitting said terminal to rotate in said tube, whereby said terminal member is suitable for mounting on other apparatus for in turn acting as a pintle for supporting said glass tube.

2. The combination with an elongated, glass tube, a wire-like, flexible electric conductor extending therethrough with a terminal end projecting beyond the tube, said tube being constricted near the end for anchoring said conductor at a point spaced inwardly from said terminal end, a metal connector rotatably fitting on to said tube near the end thereof and having an extension projecting beyond the tube, said flexible conductor being fastened to said connector extension exteriorly of the end of the tube for limiting axial movement of said connector on said tube.

3. In combination, a glass tube, a resistance conductor extending therethrough, a glass bushing fitting over the end of said tube but extending beyond said end, a metal terminal having a part within said bushing and an extension projecting therebeyond, a constriction in said tube at an overlapping part of said glass tube and bushing for gripping and securing said conductor for preventing withdrawal of said terminal from said bushing, and means fastening said conductor to the terminal extension at a point disposed exteriorly of the constriction.

4. The combination of claim 3 wherein said metal terminal is loose in said bushing and the part of said conductor between its anchorage in the glass and its fastening to said terminal extension is sufficiently flexible to permit rotation of said terminal in said bushing.

5. The combination with an elongated, glass tube, having an end, a wire-like flexible electric conductor extending therethrough, said tube being constricted near said end thereof for anchoring said conductor therein, a metal connector having a body and a bendable extension, said connector body and tube lying one within the other, whereby said connector can serve as a support for said glass tube, said connector extension projecting beyond the end of the tube and said flexible conductor extending out of said tube and being fastened to said connector extension at a point outside said tube and spaced from its anchorage therein for holding said connector and tube in assembled relation and for accommodating any misalignment in the electrical connection without bending the connector body.

6. The combination with a frangible glass tube and an electric conductor wire extending therethrough, of a metal terminal member having a comparatively rigid cylindrical part surrounding and loosely engaging the end of said tube, an elongate, flexible part connected to an end of said cylindrical part and extending therefrom longitudinally thereof and away from said tube, and a clamping part at the outer end of said flexible part by which said terminal and tube can be supported, said conductor wire being electrically connected to said metal terminal member, said glass tube having lateral projections for abutting the two ends of said cylindrical part for limiting longitudinal motion between said glass tube and cylindrical part.

7. The combination of claim 6 wherein one of said lateral projections of said glass tube lies in a keying aperture in said cylindrical part of said metal terminal member, for limiting rotation therebetween.

References Cited in the file of this patent

UNITED STATES PATENTS

| | | |
|---|---|---|
| 1,032,267 | Bastian | July 9, 1912 |
| 1,334,850 | George et al. | Mar. 23, 1920 |
| 1,548,305 | Dalton | Aug. 4, 1925 |
| 1,680,768 | Dalton | Aug. 14, 1928 |
| 1,738,150 | Phelan | Dec. 3, 1929 |
| 1,820,202 | Smalley | Aug. 25, 1931 |
| 1,942,496 | Siegel | Jan. 9, 1934 |
| 2,151,799 | Richter | Mar. 28, 1939 |
| 2,344,908 | Whitman | Mar. 21, 1944 |
| 2,369,803 | Sardeson | Feb. 20, 1945 |
| 2,443,617 | Homan | June 22, 1948 |
| 2,606,989 | Gomersall | Aug. 12, 1952 |
| 2,630,516 | Rausch et al. | Mar. 3, 1953 |

FOREIGN PATENTS

| | | |
|---|---|---|
| 249,244 | Great Britain | Mar. 25, 1926 |